(12) United States Patent
Hiratsuka

(10) Patent No.: US 9,997,774 B2
(45) Date of Patent: Jun. 12, 2018

(54) POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

(71) Applicant: Panasonic Corporation, Osaka (JP)

(72) Inventor: Hidekazu Hiratsuka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 41 days.

(21) Appl. No.: 14/965,557

(22) Filed: Dec. 10, 2015

(65) Prior Publication Data

US 2016/0254536 A1    Sep. 1, 2016

(30) Foreign Application Priority Data

Feb. 27, 2015 (JP) .................. 2015-038582

(51) Int. Cl.
| | |
|---|---|
| H01M 4/36 | (2006.01) |
| H01M 4/525 | (2010.01) |
| C01G 53/00 | (2006.01) |
| H01M 10/052 | (2010.01) |

(52) U.S. Cl.
CPC ............ *H01M 4/366* (2013.01); *C01G 53/42* (2013.01); *C01G 53/50* (2013.01); *H01M 4/525* (2013.01); *C01P 2002/60* (2013.01); *C01P 2004/50* (2013.01); *C01P 2004/61* (2013.01); *C01P 2004/84* (2013.01); *C01P 2006/40* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 2011/0052991 A1* | 3/2011 | Kim | ............... C01G 53/50 429/231 |
| 2015/0064557 A1* | 3/2015 | Kim | ............... H01M 4/0435 429/220 |
| 2016/0093885 A1* | 3/2016 | Kamata | ............... H01M 4/485 429/223 |

FOREIGN PATENT DOCUMENTS

| | | | |
|---|---|---|---|
| JP | 2009-266712 | 11/2009 | |
| JP | WO 2014181891 A1 * | 11/2014 | ........... H01M 4/485 |

OTHER PUBLICATIONS

Komori et al. JP 2009266712 A, machine translation (Nov. 2009).*

* cited by examiner

*Primary Examiner* — Wojciech Haske
(74) *Attorney, Agent, or Firm* — McDermott Will & Emery LLP

(57) ABSTRACT

A positive electrode active material for a nonaqueous electrolyte secondary battery contains a lithium composite oxide particle as a main component, in which a ratio of Ni to a total number of moles of all metal elements other than Li is greater than 30 mol %. The lithium composite oxide particle includes a secondary particle being aggregation of primary particles having an average particle diameter of 1 μm or more, and a shell constituted around the secondary particle. A surface layer void is present between the secondary particle and the shell.

4 Claims, 3 Drawing Sheets

POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

BACKGROUND

1. Technical Field

The present disclosure relates to a positive electrode active material for a nonaqueous electrolyte secondary battery, and to a nonaqueous electrolyte secondary battery.

2. Description of the Related Art

Japanese Unexamined Patent Application Publication No. 2009-266712 proposes a positive electrode active material for a lithium secondary battery and for improving cycle characteristics, storage stability, etc., of the battery. This positive electrode active material is represented by $Li_xNi_{1-y-z}Co_yM_zO_2$ and is constituted by primary particles having large particle diameters.

However, a battery that uses the positive electrode active material described in the aforementioned patent document has a small capacity per active material weight and a low active material utilization rate.

SUMMARY

One non-limiting and exemplary embodiment provides a positive electrode active material for a nonaqueous electrolyte secondary battery. The positive electrode active material contains a lithium composite oxide particle as a main component, in which a ratio of Ni to a total number of moles of all metal elements other than Li is greater than 30 mol %. The lithium composite oxide particle includes a secondary particle being aggregation of primary particles having an average particle diameter of 1 μm or more, and a shell constituted around the secondary particle. A surface layer void is present between the secondary particle and the shell.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
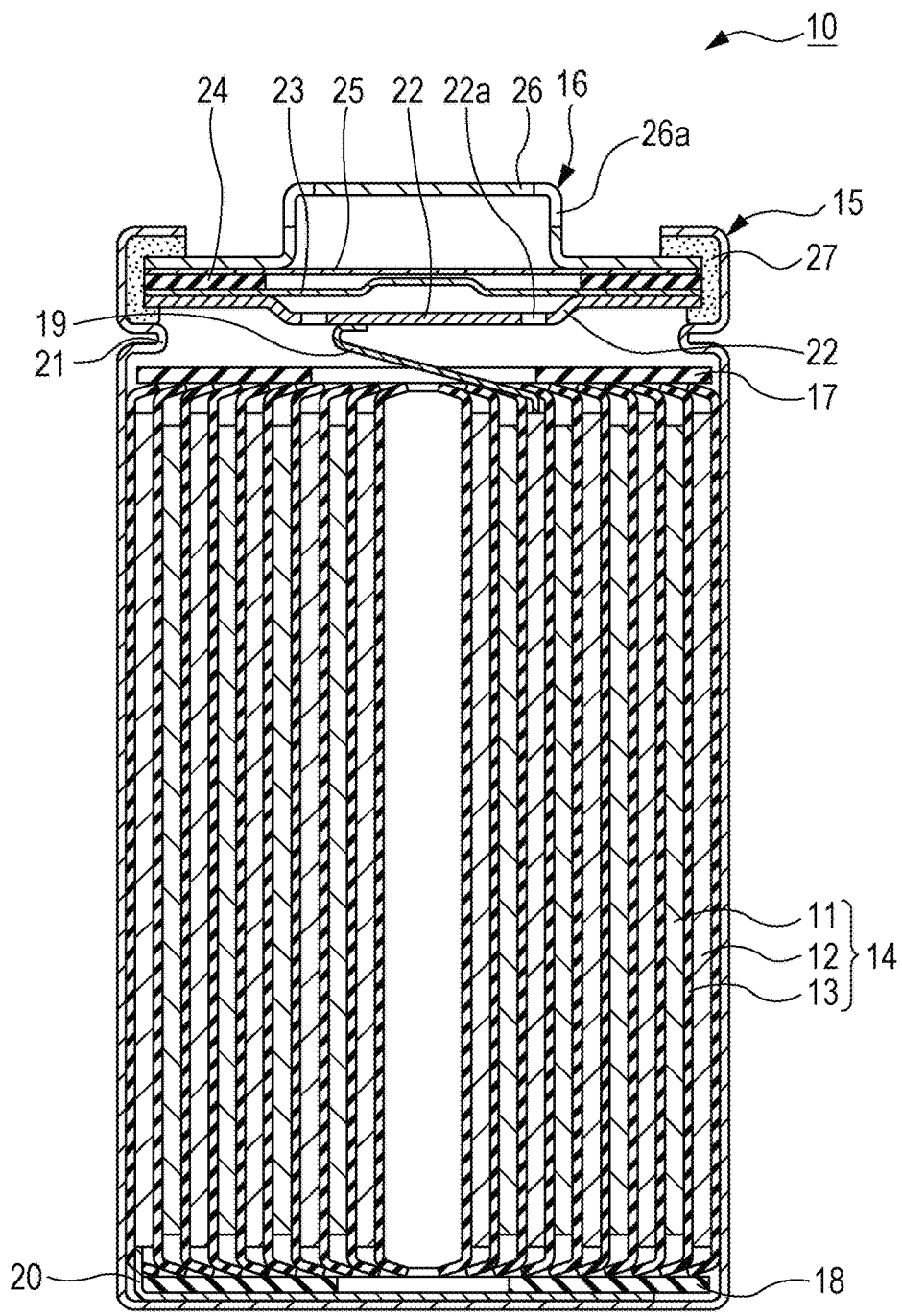
FIG. 1 is a cross-sectional view of a nonaqueous electrolyte secondary battery according to an exemplary embodiment.

Inventors have conducted extensive studies to develop a nonaqueous electrolyte secondary battery having a high positive electrode active material utilization rate and good cycle characteristics. They have found that such battery properties can all be achieved when lithium composite oxide particles constituted by primary particles whose average particle diameter is 1 μm or more and having surface layer voids are used as a positive electrode active material. Since the positive electrode active material of this disclosure is constituted by primary particles having a large particle diameter, the positive electrode active material is resistant to pulverization caused by charging and discharging, and there will be fewer primary particles that are isolated from the conductive network in the event of cracking of the active material particles by charging and discharging. Thus, a nonaqueous electrolyte secondary battery that uses a positive electrode active material of the present disclosure has good cycle characteristics. Moreover, it is presumed that since surface layer voids are constituted between the shell and a secondary particle constituting the lithium composite oxide particle, the surface area of the active material that contributes to battery reaction is increased and the capacity per active material weight is improved. In contrast, when primary particles having a large particle diameter, such as the positive electrode active material disclosed in the aforementioned patent document, are simply used, cycle characteristics are generally satisfactory but the active material utilization rate is decreased due to a decrease in active material reaction area (refer to Comparative Example 1 described below).

An exemplary embodiment will now be described in detail.

The drawings referred in the Detailed Description are schematic and the structural components in the drawings may be depicted at dimensional ratios different from those of actual apparatuses. Specific dimensional ratios and other features are to be understood from the description provided below.

FIG. 1 is a cross-sectional view of a nonaqueous electrolyte secondary battery 10 according to an exemplary embodiment.

The nonaqueous electrolyte secondary battery 10 includes a positive electrode 11, a negative electrode 12, and a nonaqueous electrolyte. A separator 13 is desirably disposed between the positive electrode 11 and the negative electrode 12. The nonaqueous electrolyte secondary battery 10 is obtained by, for example, placing into a battery case a nonaqueous electrolyte and a wound electrode assembly 14 prepared by winding the positive electrode 11, the negative electrode 12, and the separator 13 placed between the electrodes. The wound electrode assembly 14 may be replaced with some other type of electrode assembly, such as a laminated electrode assembly obtained by alternately stacking a positive electrode and a negative electrode with a separator interposed therebetween. Examples of the battery case that accommodates the electrode assembly 14 and the nonaqueous electrolyte include cylindrical, prismatic, coin-shaped, and button-shaped metal cases, and resin cases (laminate-type batteries) formed by laminating resin sheets. In the example shown in FIG. 1, the battery case is constituted by a case main body 15 having a bottom and a cylindrical shape, and a sealing member 16.

The nonaqueous electrolyte secondary battery 10 includes insulating plates 17 and 18 respectively disposed on the top and at the bottom of the electrode assembly 14. In the example shown in FIG. 1, a positive electrode lead 19 attached to the positive electrode 11 extends through a penetrating hole in the insulating plate 17 and toward the sealing member 16. A negative electrode lead 20 attached to the negative electrode 12 runs on the outer side of the insulating plate 18 and extends toward the bottom of the case main body 15. For example, the positive electrode lead 19 is connected to a lower surface of a filter 22 which serves as a bottom plate of the sealing member 16 by welding, for example, and a cap 26 serving as a top plate of the sealing member 16 electrically connected to the filter 22 functions as a positive electrode terminal. The negative electrode lead 20 is connected to an inner surface of the bottom of the case main body 15 by welding, for example, and the case main body 15 functions as a negative electrode terminal. In this embodiment, a current interrupt device (CID) and a gas discharge mechanism (safety valve) are formed in the sealing member 16. Another gas discharge valve is desirably formed in the bottom of the case main body 15.

The case main body 15 is, for example, a metal container having a bottom and a cylindrical shape. A gasket 27 is disposed between the case main body 15 and the sealing member 16 to keep the interior of the battery case airtight. The case main body 15 desirably has a projecting portion 21 that is formed by, for example, pressing a portion of a side surface from outside and that supports the sealing member 16. The projecting portion 21 desirably has a ring shape that extends in the circumferential direction of the case main body 15, and supports the sealing member 16 at its upper surface.

The sealing member 16 includes the filter 22 having a filter opening 22a, and a valve member disposed on the filter 22. The valve member covers the filter opening 22a of the filter 22 and breaks once the inner pressure of the battery is increased by heat generated by internal short-circuiting or other phenomenon. In this embodiment, the valve member includes a lower valve member 23 and an upper valve member 25, an insulating member 24 disposed between the lower valve member 23 and the upper valve member 25, and the cap 26 having a cap opening 26a. Each of the components that constitute the sealing member 16 has a disk shape or a ring shape, and the components other than the insulating member 24 are electrically connected to one another. Specifically, the filter 22 and the lower valve member 23 are connected to each other at the rim portions thereof, and the upper valve member 25 and the cap 26 are connected to each other at the rim portions thereof. The lower valve member 23 and the upper valve member 25 are connected to each other at the central portions thereof, and the insulating member 24 is interposed between the rim portions of these valve members. When the inner pressure is increased by the heat generated by internal short-circuiting or other phenomenon, for example, the lower valve member 23 breaks at its thin part, the upper valve member 25 thereby bulges toward the cap 26 and separates from the lower valve member 23, and electrical connection therebetween is interrupted.

Positive Electrode

The positive electrode is, for example, constituted by a positive electrode current collector formed of a metal foil or the like, and positive electrode active material layers formed on the positive electrode current collector. Examples of the positive electrode current collector include a foil of a metal, such as aluminum, that is stable within the potential range of the positive electrode, and a film coated with such a metal. The positive electrode active material layers desirably contain a conductive material and a binder in addition to the positive electrode active material. The positive electrode can be prepared by applying onto a positive electrode current collector a positive electrode mix slurry containing a positive electrode active material, a conductive material, a binder, and other suitable additives, drying the resulting coatings, and performing rolling so that positive electrode active material layers are formed on both sides of the current collector.

The conductive material is used to increase electrical conductivity of the positive electrode active material layers. Examples of the conductive material include carbon materials such as carbon black, acetylene black, Ketjen black, and graphite. These may be used alone or in combination.

The binder is used to maintain a satisfactory contact state between the positive electrode active material and the conductive material and strengthen the bond between the positive electrode active material and the surfaces of the positive electrode current collector, for example. Examples of the binder include fluorocarbon resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethyl cellulose (CMC) or a salt thereof (CMC-Na, CMC-K, CMC-NH$_4$, or the like which may be a partially neutralized salt), polyethylene oxide (PEO), or the like. These may be used alone or in combination.

Figure 2:
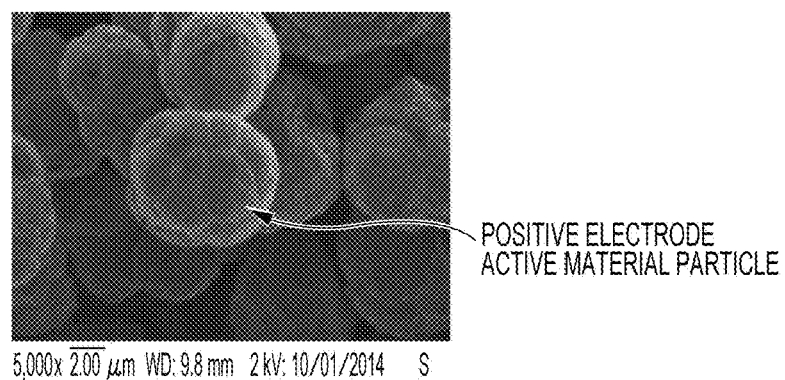
FIG. 2 is an electron microscope image of a positive electrode active material according to an exemplary embodiment (Example 1)
Figure 3:
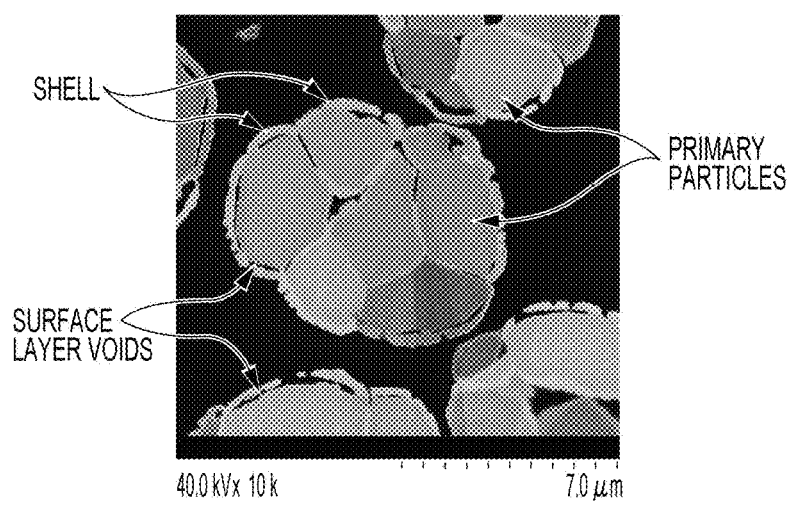
FIG. 3 is an electron microscope image showing a particle cross-section of the positive electrode active material of the exemplary embodiment (Example 1)

A positive electrode active material according to an exemplary embodiment will now be described with reference to FIGS. 2 and 3. FIGS. 2 and 3 are scanning electron microscope (SEM) images of a positive electrode active material of an exemplary embodiment (refer to Example 1 described below). FIG. 3 is a SEM image of a particle cross-section obtained by using a cross-section polisher (CP). This cross-section is hereinafter referred to as a "CP cross-section".

The positive electrode active material contains, as a main component, lithium composite oxide particles in which the ratio of nickel (Ni) to the total number of moles of all metal elements other than lithium (Li) is greater than 30 mol %. The main component is the component that has the largest content among the materials constituting the positive electrode active material. The lithium composite oxide particles contain secondary particles formed by aggregation of primary particles having an average particle diameter of 1 μm or more, and shells formed around the secondary particles. Surface layer voids are present between the second particles and the shells. In the description below, the lithium composite oxide particles are referred to as a "composite oxide A".

The positive electrode active material may contain any component other than the composite oxide A, for example, a lithium composite oxide which is not the composite oxide A. Fine particles of an inorganic compound, for example, an oxide such as aluminum oxide ($Al_2O_3$) or a lanthanoid-element-containing compound, may be present on the particle surfaces of the composite oxide A. The composite oxide A content relative to the total weight of the positive electrode active material is desirably 50% by weight or more, more desirably 80% by weight or more, and yet more desirably 100% by weight. In this embodiment, the positive electrode active material is solely composed of the composite oxide A. In this case, the composite oxide A has the same meaning as the positive electrode active material.

The composite oxide A is desirably a composite oxide represented by general formula $Li_xNi_yM_{(1-y)}O_2$ (where $0.1 \le x \le 1.2$, $0.3 < y < 1$, and M is at least one metal element). The Ni content y is desirably larger than 0.3 in order to cut cost and increase capacity, for example. The composite oxide A has a layered rocksalt-type crystal structure.

Examples of the metal element M contained in the composite oxide A include Co, Mn, Mg, Zr, Al, Cr, V, Ce, Ti, Fe, K, Ga, and In. At least one selected from cobalt (Co), manganese (Mn), and aluminum (Al) is desirably contained. In order to cut cost and improve safety, for example, at least Mn is desirably contained. A desirable example of the composite oxide A is $LiNi_{0.33}Co_{0.33}Mn_{0.33}O_2$. The composite oxide A may be one composite oxide or two or more composite oxides.

The composite oxide A (positive electrode active material) contains secondary particles formed by aggregation of primary particles having an average particle diameter of 1 μm or more, as described above. Accordingly, boundaries of primary particles are present in the composite oxide A. The boundaries of the primary particles can be observed with a SEM, as shown in FIGS. 2 and 3. In other words, the portion defined by a boundary is the primary particle. The secondary particles, i.e., the composite oxide A, may aggregate but the secondary particles forming aggregates can be separated from one another by ultrasonic dispersion. However, the secondary particles do not separate into primary particles by ultrasonic dispersion.

As shown in FIG. 3, the composite oxide A has shells around the secondary particles. In other words, the composite oxide A can be described as core-shell particles each having a core formed of a secondary particle and a shell surrounding the core. A shell is a thin coating surrounding a secondary particle and has, for example, substantially the same composition as the secondary particle. Surface layer voids are formed between the secondary particle (core) and the shell. The surface layer voids are formed along the surface of the particle of the composite oxide A so that there is an empty space between the shell and the particle surface. The surface layer voids can be observed in the SEM image of the CP cross-section of the composite oxide A.

The surface layer voids are desirably not completely enclosed spaces but spaces in communication with outside. In other words, the shell has openings through which an electrolyte penetrates into the surface layer voids, and presumably because of this, the surface area of the positive electrode active material contributing to the battery reaction is increased and the capacity per active material weight is improved. The surface layer voids remain even after charge and discharge cycles are repeated, and the surface layer void ratio described below remains substantially the same.

The surface layer voids are desirably formed in a range that extends from the particle surface of the composite oxide A by a length equal to 10% or less of the particle diameter of that particle and desirably 5% or less of the particle diameter. The particle diameter of the composite oxide A refers to the largest diameter observed in a SEM image of the CP cross-section of the composite oxide A in this specification. When empty spaces are formed near the surface of the composite oxide A, the reaction area can be efficiently increased. The composite oxide A may have voids in part other than the part near the surface (hereinafter this part near the surface may also be referred to as "surface layer portion"). The voids formed in part other than the part near the surface (hereinafter such voids are referred to as "inner voids") are, for example, empty spaces formed between primary particles and are mostly closed spaces that do not communicate with outside of the particles. Thus, it is believed that the electrolyte does not penetrate most of the inner voids and thus inner voids rarely contribute to increasing the reaction area.

Among all voids (surface layer voids+inner voids) formed in the composite oxide A, the surface layer voids formed within the range that extends from the surface of the particle by a length equal to 5% or less of the particle diameter of the particle desirably account for 10% or more of all voids. This ratio is hereinafter referred to as the "surface layer void ratio". The surface layer void ratio varies among particles of the composite oxide A, for example. In some particles of the composite oxide A, there are more surface layer voids than the inner voids.

The average value of the surface layer void ratio (average surface layer void ratio) is desirably 10% or more, more desirably 12% or more, and most desirably 14% or more. The average surface layer void ratio is, for example, 10% to 70%, 10% to 50%, or 10% to 40%. The surface layer void ratio is determined by observing the CP cross-sections of the particles, as described below. The average surface layer void ratio can be assumed to be the average value of the ratios of the volume of the surface layer voids to the total volume of all voids, that is, the average of (volume of surface layer voids/total volume of voids)×100. Given that the total volume of the voids is the same, there is a tendency that the higher the surface layer void ratio (average), the higher the active material utilization rate (refer to Examples described below).

The surface layer void ratio and the average thereof can be determined by using a SEM.

Specifically, the surface layer void ratio and the average thereof can be determined as follows.

(1) Select 100 particles at random from a SEM image obtained by observing a CP cross-section of the composite oxide A by using a SEM (×2000 magnification).

(2) Draw an outline along a surface of each of the selected 100 particles, determine the total area of the voids in a region surrounded by the outline, and determine the area (total area) of surface layer voids formed within a range that extends from the particle surface by a length equal to 5% or less of the particle diameter of that particle.

(3) Calculate the surface layer void ratio (%) by using the formula (area of surface layer voids/total area of voids)× 100 for each of 100 particles. Average the results to determine the average surface layer void ratio.

A shell is formed around the primary particles constituting a secondary particle of the composite oxide A, for example, and surface layer voids are formed between the primary particle and the shell. In other words, unlike the inner voids, the surface layer voids are spaces not formed between the primary particles. Spaces between the primary particle and the shell are selectively formed only in the surface layer portion of the composite oxide A (these spaces are the surface layer voids) and are never or almost never formed in portions other than the surface layer portion. Although a surface layer void formed on a surface of a primary particle may be in communication with a surface layer void of an adjacent primary particle, the surface layer voids are desirably independent from each other and not in communication with each other.

The average particle diameter of the primary particles constituting the composite oxide A (hereinafter referred to as "average primary particle diameter") is 1 μm or more as mentioned above, desirably 1.5 to 15 μm, more desirably 2 to 10 μm, and most desirably 2 to 5 μm. As long as the average primary particle diameter is within this range, the composite oxide A rarely undergoes pulverization caused by charging and discharging, and there will be fewer primary particles that are isolated from the conductive network in the event of cracking of the active material particles by charging and discharging. Thus, good cycle characteristics can be obtained.

The average primary particle diameter can be determined by using a SEM.

Specifically, the average primary particle diameter can be determined as follows.

(1) Select 10 particles at random from a particle image obtained by observing the composite oxide A with a SEM (×2000 magnification).
(2) Observe particle boundaries etc., of the selected 10 particles and identify the primary particles of each selected particle.
(3) Determine the largest diameter of primary particles, and the average value of the diameters of the 10 selected particles is assumed to be the average primary particle diameter.

A primary particle is made up of plural crystallites. The size of the crystallites of the composite oxide A can be expressed as a crystallite size in a (003) vector direction which is a direction in which layers are stacked in a layered rocksalt-type crystal structure and as a crystallite size in a (110) vector direction which is a direction perpendicular to the (003) vector direction. In this specification, the crystallite size is determined as the crystallite size in the (110) vector direction. The average crystallite size of the composite oxide A in the (110) vector direction is desirably 100 to 300 nm, more desirably 110 to 250 nm, and most desirably 120 to 230 nm. As long as the average crystallite size is within this range, ion conductivity of the composite oxide A can be improved, for example.

The crystallite size is determined by obtaining a powder X-ray diffraction pattern of the composite oxide A by using a powder X-ray diffraction analyzer (trade name: D8ADVANCE produced by Bruker AXS K.K.) and analyzing the powder X-ray diffraction pattern through a whole powder pattern decomposition method (hereinafter referred to as "WPPD method").

The measurement conditions for the powder X-ray diffraction pattern are as follows:
X-ray output: 40 kV×40 mA
Detector: scintillation counter
Goniometer radius: 250 mm
Divergence slit: 0.6°
Scattering slit: 0.6°
Receiving slit: 0.1 mm
Soller slit: 2.5° (incident side, receiving side)

Measurement of the powder X-ray diffraction pattern is performed by a 2θ/θ method (measured at 2θ=15° to 140° with a step width of 0.01°) with a parallel specimen focusing geometry. The scanning time is set so that the intensity of the main peak ((111) plane) is about 10,000 counts.

The analytical procedure of the WPPD method is as follows.

Step 1: Start software (TOPAS) and load measurement data.
Step 2: Set Emission Profile (select Cu bulb, Bragg Brentano focusing geometry).
Step 3: Set Background (use Legendre polynominal as the profile function and set the number of terms to 8 to 20).
Step 4: Set Instrument (use Fundamental Parameter and input slit conditions, filament length, and sample length).
Step 5: Set Corrections (use Sample Displacement and also Absorption if sample packing density in sample holder is low, in which case Absorption is fixed to a line absorption coefficient of the measurement specimen).
Step 6: Set crystal structure (Select space group R3-m. Use lattice constant, crystallite size, and lattice strain. Set profile broadening due to crystallite size and lattice strain to Lorentzian).
Step 7: Execute calculation (refine background, sample displacement, diffraction intensity, lattice constant, crystallite size, and lattice strain and use Le Bail method for calculation).
Step 8: End analysis if the standard deviation of crystallite size is 6% or less of the refined value. Proceed to Step 9 if larger than 6%.
Step 9: Set profile broadening due to lattice strain to Gaussian (Keep Lorentzian for crystallite size).
Step 10: Execute calculation (refine background, sample displacement, diffraction intensity, lattice constant, crystalline size, and lattice strain).
Step 11: End analysis if the standard deviation of crystallite size is 6% or less of the refined value. Analysis is failed if larger than 6%.

The volume-average particle diameter (Dv) of the composite oxide A is desirably 7 to 30 μm, more desirably 8 to 30 μm, and most desirably 9 to 25 μm. As long as Dv is within this range, for example, the surface roughness of the composite oxide A tends to be small and the packing density of the composite oxide A in the positive electrode is improved. Dv of the composite oxide A can be measured by a light diffraction scattering method. Dv is the particle diameter at a volume integrated value of 50% in a particle diameter distribution and is also referred to as a median diameter.

The composite oxide A has smooth particle surfaces with small irregularities. The degree of smoothness (irregularities) of the particle surfaces can be evaluated through surface roughness measured by the procedure described below. The average surface roughness of the composite oxide A is desirably small. Specifically, the average surface roughness is desirably 4% or less and more desirably 3% or less. As long as the average surface roughness is 4% or less, output properties of the battery are improved, and the packing density of the composite oxide A in the positive electrode is improved. Desirably, 90% or more of the composite oxide A has a surface roughness of 4% or less and more desirably 95% or more of the composite oxide A has a surface roughness of 4% or less.

The average surface roughness of the composite oxide A is calculated by determining surface roughness of each particle. The surface roughness of 10 particles is measured, and the results are averaged to obtain an average surface roughness. The surface roughness (%) is calculated by using the following surface roughness calculation formula described in International Publication No. 2011/125577:

(Surface roughness)=(largest amount of change in particle radius $r$ per degree)/(largest diameter of particle)

The particle radius r is the distance between a center C of a particle to a point on the perimeter of the particle, where the center C is defined as a point that bisects the largest diameter of the particle in profile analysis using a SEM image of the composite oxide A. The amount of change in particle radius r per degree is an absolute value. The maximum value is the largest change per degree observed by measuring the radius throughout the entire perimeter of the particle.

The composite oxide A can be synthesized from a lithium material as with typical lithium-transition metal composite oxides ($LiCoO_2$, $LiNi_{0.33}Mn_{0.33}Co_{0.33}O_2$, etc.) that are commonly used. However, in order to obtain a stable layered rocksalt phase by a typical method, excess Li is needed and the firing temperature needs to be in the range of 700° C. to 900° C. If the firing temperature is lower than 700° C., insufficient crystal growth results. If the firing temperature is higher than 900° C., Ni ions enter Li sites and site exchange (cation mixing) between Ni ions and Li ions occurs. As a result, the crystal structure may deform and battery characteristics may be degraded. Synthesis of the composite oxide A while controlling the firing temperature as such is difficult compared to synthesis of typical lithium-transition metal composite oxides from a lithium raw material.

A desirable example of a method for synthesizing the composite oxide A is a method that involves exchanging Na ions of a sodium-nickel composite oxide, which has been synthesized by firing a mixture of a sodium raw material and a nickel raw material, with Li ions. In order to make a composite oxide A containing Co, Mn, etc., nickel composite compound particles prepared by homogeneously melting a nickel raw material and other metal materials such as a cobalt raw material and a manganese raw material and forming particles therefrom is used as the nickel raw material to be mixed with the sodium raw material. According to this method as compared with the method for synthesizing a lithium-nickel composite oxide from a lithium raw material, a layered rocksalt phase can be obtained even when the firing temperature and the Na content of the sodium-nickel composite oxide are varied significantly, and physical properties and crystal size of the synthesized product can be controlled. In general, a composite oxide containing Ni is likely to have a small primary particle diameter and form particles with large surface roughness; however, if this method is employed, deformation and collapse of the crystal structure do not occur during firing and crystal growth proceeds smoothly. Thus, the particle profile can be controlled.

The method for synthesizing a sodium-nickel composite oxide is as follows.

At least one material selected from metallic sodium and a sodium compound is used as the sodium raw material. The sodium compound may be any compound containing Na. Desirable examples of the sodium raw material include oxides such as $Na_2O$ and $Na_2O_2$, salts such as $Na_2CO_3$ and $NaNO_3$, and hydroxides such as NaOH. Among these, $NaNO_3$ is particularly desirable.

Any compound containing Ni can be used as a nickel raw material. Examples of the compound include oxides such as $Ni_3O_4$, $Ni_2O_3$, and $NiO_2$, salts such as $NiCO_3$ and $NiCl_2$, hydroxides such as $Ni(OH)_2$, and oxyhydroxides such as NiOOH. Among these, $NiO_2$ and $Ni(OH)_2$ are particularly desirable.

The mixing ratios of the sodium raw material and the nickel raw material are desirably adjusted in such a manner that a layered rocksalt-type crystal structure is generated. Specifically, the sodium content z in general formula $Na_zNiO_2$ is desirably 0.5 to 2, more desirably 0.8 to 1.5, and most desirably 1. For example, the sodium raw material and the nickel raw material are mixed to yield a chemical composition of $NaNiO_2$. The mixing method may be any method that can homogeneously mix these two materials. For example, the materials may be mixed by using a known mixing apparatus such as a mixer.

The mixture of the sodium raw material and the nickel raw material is fired in air or under oxygen stream. The firing temperature is desirably 600° C. to 1100° C. and more desirably 700° C. to 1000° C. The firing time is desirably 1 to 50 hours if the firing temperature is 600° C. to 1100° C. The firing time is desirably 1 to 10 hours if the firing temperature is 900° C. to 1000° C. The fired product is desirably pulverized by a known method. As a result, a sodium-nickel composite oxide is obtained.

The ion exchange method for the sodium-nickel composite oxide is as follows.

A desirable example of a method for ion-exchanging Na by Li is a method that involves adding a molten salt bed of a lithium salt to a sodium-transition metal composite oxide, and heating the resulting mixture. The lithium salt is desirably at least one selected from lithium nitrate, lithium sulfate, lithium chloride, lithium carbonate, lithium hydroxide, lithium iodide, and lithium bromide. The heating temperature during ion exchange treatment is desirably 200° C. to 400° C. and more desirably 330° C. to 380° C. The treatment time is desirably 2 to 20 hours and more desirably 5 to 15 hours.

Another suitable method for performing ion exchange treatment includes immersing a sodium-containing transition metal oxide into a solution containing at least one lithium salt. In such a case, a sodium-transition metal composite oxide is added to an organic solvent in which a lithium salt is dissolved, and is treated at a temperature equal to or lower than the boiling point of the organic solvent. The ion exchange treatment is desirably conducted by refluxing the solvent near the boiling point of the organic solvent in order to increase the ion exchange speed. The treatment temperature is desirably 100° C. to 200° and more desirably 140° C. to 180° C. The treatment time is desirably 5 to 50 hours and more desirably 10 to 20 hours although the treatment time differs depending on the treatment temperature.

A lithium-nickel composite oxide prepared through ion exchange described above may contain a certain amount of Na due to incomplete ion exchange. In such a case, the lithium-nickel composite oxide is expressed by, for example, general formula $Li_{xu}Na_{x(1-u)}Ni_yM_{(1-y)}O_2$ (where $0.1 \leq x \leq 1.2$, $0.3 < y < 1$, $0.95 < u \leq 1$). In the formula, u represents a ratio of ion-exchanging Na by Li.

A lithium salt, a nickel raw material, and, if needed, other metal oxides and the like are added to the lithium-nickel composite oxide and the resulting mixture is fired again. As a result, a composite oxide A having surface layer voids is obtained. The lithium-nickel composite oxide takes a form of secondary particles which are aggregates of primary particles having an average particle diameter of 1 μm or more, and the physical properties, such as particle diameter, surface roughness, and density, of the composite oxide A are substantially determined prior to the re-firing. The exact and detailed mechanism behind formation of surface layer voids is not clear, but surface layer voids are probably formed due to difference in progress of sintering between the particles and substances added to the surfaces of the particles during the re-firing where the particles having high sinterability contract and surface layer voids are formed as a result. It is presumed that the additive components penetrate into the particles by migrating along the surfaces of the primary particles during re-firing, and a shell surrounding primary particles constituting the composite oxide A is formed as a result, if any shell is to be formed around the primary particles.

Re-firing is conducted in air or under oxygen stream. The re-firing temperature needs to be lower than the temperature of the first firing, namely, the temperature at which a mixture of a sodium raw material and a nickel raw material is fired. A desirable re-firing temperature is 700° C. to 1050° C., and the desirable re-firing time is 1 to 50 hours, which is longer than the time of the first firing. Surface layer voids can be formed without significantly changing the crystallite size and surface roughness, for example, by re-firing at a temperature of 700° C. or higher but lower than the temperature of the first firing. The re-fired product is desirably pulverized by a common method.

Negative Electrode

A negative electrode is constituted by a negative electrode current collector formed of, for example, a metal foil, and negative electrode mix layers formed on the current collector. Examples of the negative electrode current collector include a foil of a metal, such as copper, that is stable within the potential range of the negative electrode, and a film coated with such a metal. The negative electrode mix layers desirably contain a binder in addition to the negative electrode active material. The negative electrode can be prepared by, for example, applying a negative electrode mix slurry containing a negative electrode active material, a binder, and other suitable additives to a negative electrode current collector, drying the resulting coatings, and performing rolling so that negative electrode mix layers are formed on both sides of the current collector.

The negative electrode active material may be any material that can reversibly store and release lithium ions. Examples thereof include carbon materials such as natural graphite and artificial graphite, metals, such as silicon (Si) and tin (Sn), that alloy with lithium, and alloys and composite oxides containing metal elements such as Si and Sn. These negative electrode active materials can be used alone or in combination.

As in the case of the positive electrode, fluorocarbon resins, PAN, polyimide resins, acrylic resins, polyolefin resins, and the like can be used as the binder. In the case where a mix slurry is prepared by using an aqueous solvent, the binder is desirably CMC or a salt thereof (for example, CMC-Na, CMC-K, CMC-NH$_4$, or a partially neutralized salt thereof), styrene-butadiene rubber (SBR), polyacrylic acid (PAA) or a salt thereof (for example, PAA-Na, PAA-K, or a partially neutralized salt thereof), or a polyvinyl alcohol (PVA), for example.

Separator

A porous sheet having ion permeability and an insulating property is used as a separator. Specific examples of the porous sheet include a microporous thin membrane, woven cloth, and non-woven cloth. The material of the separator is desirably a polyolefin resin such as polyethylene or polypropylene, or a cellulose, for example. The separator may be a multilayer sheet constituted by a cellulose fiber layer and a thermoplastic resin fiber layer made of a polyolefin resin or the like. The separator may be a multilayer separator including a polyethylene layer and a polypropylene layer or a separator coated with an aramid resin or the like.

A filler layer containing an inorganic filler may be formed on at least one interface selected from a separator-positive electrode interface and a separator-negative electrode interface. An example of the inorganic filler is an oxide or phosphate compound that contains at least one selected from titanium (Ti), aluminum (Al), silicon (Si), and magnesium (Mg). The filler layer can be formed by, for example, applying a slurry containing the filler to surfaces of the positive electrode, the negative electrode, or the separator.

Nonaqueous Electrolyte

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte that uses a gel polymer or the like. Examples of the nonaqueous solvent include esters, ethers, nitriles such as acetonitrile, amides such as dimethylformamide, and mixed solvents containing two or more selected from the foregoing. The nonaqueous solvent may contain a halogen-substituted product obtained by substituting at least some of hydrogen atoms in the solvent with halogen atoms such as fluorine atoms.

Examples of the esters include cyclic carbonate esters such as ethylene carbonate (EC), propylene carbonate (PC), and butylene carbonate, linear carbonate esters such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and linear carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product include fluorinated cyclic carbonate esters such as fluoroethylene carbonate (FEC), fluorinated linear carbonate esters, and fluorinated linear carboxylate esters such as methyl fluoropropionate (FMP).

The electrolyte salt is desirably a lithium salt. Examples of the lithium salt include LiBF$_4$, LiClO$_4$, LiPF$_6$, LiAsF$_6$, LiSbF$_6$, LiAlCl$_4$, LiSCN, LiCF$_3$SO$_3$, LiCF$_3$CO$_2$, Li(P(C$_2$O$_4$)F$_4$), LiPF$_{6-x}$(C$_n$F$_{2n+1}$)$_x$ (where 1<x<6, n=1 or 2), LiB$_{10}$Cl$_{10}$, LiCl, LiBr, LiI, chloroboranelithium, lithium lower aliphatic carboxylate, borates such as Li$_2$B$_4$O$_7$ and Li(B(C$_2$O$_4$)F$_2$), and imide salts such as LiN(SO$_2$CF$_3$)$_2$ and LiN(C$_l$F$_{2l+1}$SO$_2$)(C$_m$F$_{2m+1}$SO$_2$) (where l and m each represent an integer of 1 or more). Lithium salts may be used alone or in combination as a mixture. Among these lithium salts, LiPF$_6$ is desirably used from the viewpoints of ion conductivity and electrochemical stability, for example. The lithium salt concentration is desirably 0.8 to 1.8 mol per liter of the nonaqueous solvent.

EXAMPLES

The present disclosure will now be described in further detail through Examples below which do not limit the scope of the disclosure.

Example 1

Preparation of Positive Electrode Active Material

Reaction was conducted at a pH of 12 and a temperature of 40° C. by slowly adding dropwise an aqueous sodium hydroxide (NaOH) solution and an aqueous ammonia (NH$_3$)

solution to an aqueous solution of a mixture of nickel sulfate ($NiSO_4$), cobalt sulfate ($CoSO_4$), and manganese sulfate ($MnSO_4$) (Ni/Co/Mn molar ratio=0.32/0.34/0.34). The resulting reaction product was filtered, washed with water, and dried at 120° C. As a result, hydroxide particles having a composition of $Ni_{0.33}Co_{0.33}Mn_{0.33}(OH)_2$ was obtained. The hydroxide particles were then mixed with sodium nitrate ($NaNO_3$) so that the Li/(Ni+Co+Mn) molar ratio was 0.95. The mixture was retained at a firing temperature of 1000° C. for 35 hours. As a result, a sodium-nickel composite oxide was obtained.

A molten salt bed prepared by mixing lithium nitrate ($LiNO_3$) and lithium hydroxide (LiOH) at a $LiNO_3$/LiOH molar ratio of 61:39 was added to the sodium-nickel composite oxide so that there were 5 eq (25 g) of the molten salt bed with respect to 5 g of the sodium-nickel composite oxide. The mixture was retained at a firing temperature of 200° C. for 10 hours to exchange the Na ions in the sodium-nickel composite oxide with Li ions. The substance after ion exchange was washed with water. A lithium-nickel composite oxide was obtained as a result.

A hydroxide having a composition of $Ni_{0.33}Co_{0.33}Mn_{0.33}(OH)_2$ and a molten salt bed of the lithium compound described above were added to the lithium-nickel composite oxide, and the resulting mixture was re-fired at 900° C. for 50 hours to obtain a composite oxide A1. The composite oxide A1 obtained by re-firing was classified and those particles with Dv of 9.9 μm were used as a positive electrode active material A1. The average particle diameter of the primary particles constituting the positive electrode active material A1 was 4.0 μm.

The positive electrode active material A1 was analyzed by powder X-ray diffractometry with a powder X-ray diffraction analyzer (trade name: D8ADVANCE produced by Bruker AXS K.K., line source: Cu-Kα) to identify the crystal structure. The crystal structure obtained was assigned to a layered rocksalt-type crystal structure. The composition of the positive electrode active material A1 was analyzed with an ICP emission spectrometer (trade name: iCAP6300, produced by Thermo Fisher Scientific), and was found to be $Li_{1.05}Ni_{0.33}Co_{0.33}Mn_{0.33}O_2$.

FIG. 2 shows a SEM image of the positive electrode active material A1 and FIG. 3 shows a SEM image of a CP cross-section of the positive electrode active material A1. From the SEM images, presence of surface layer voids near the particle surfaces of the positive electrode active material A1 can be confirmed. The images also show that the positive electrode active material A1 has smooth particle surfaces and little surface irregularities.

Preparation of Positive Electrode

A mixture of 95.8% by weight of the positive electrode active material A1, 3% by weight of carbon powder, and 1.2% by weight of polyvinylidene fluoride powder were mixed with an appropriate amount of N-methyl-2-pyrrolidone (NMP) to prepare a positive electrode mix slurry. The slurry was applied to both sides of an aluminum current collector having a width of 57.4 mm, a length of 566.5 mm, and a thickness of 15 μm by a doctor blade method, and the resulting coatings were dried and rolled by a rolling rollers so as to obtain a positive electrode constituted by a positive electrode current collector and positive electrode mix layers respectively disposed on both sides of the positive electrode current collector. A portion where no mix layer is formed is formed in a central portion of the current collector in the longitudinal direction and a positive electrode tab was attached to that portion.

Preparation of Negative Electrode

A mixture of 98.2% by weight of a negative electrode active material, 0.7% by weight of styrene-butadiene rubber, and 1.1% by weight of sodium carboxymethylcellulose was mixed with water to prepare slurry. A mixture of natural graphite, artificial graphite, and artificial graphite coated with amorphous carbon was used as the negative electrode active material. The slurry was applied to both sides of a copper current collector having a width of 59.2 mm, a length of 670 mm, and a thickness of 10 μm by a doctor blade method, and the resulting coatings were dried and rolled with rolling rollers to obtain a negative electrode constituted by a negative electrode current collector and negative electrode mix layers respectively disposed on both sides of the negative electrode current collector. A portion where no mix layer is formed is formed in each end portion of the current collector in the longitudinal direction and a negative electrode tab was attached to that portion.

Preparation of Nonaqueous Electrolyte

A nonaqueous electrolyte solution was obtained by dissolving 1.6 mol/L of $LiPF_6$ in an equivolume mixture nonaqueous solvent of ethylene carbonate (EC) and diethyl carbonate (DEC).

Preparation of Nonaqueous Electrolyte Secondary Battery

A nonaqueous electrolyte secondary battery B1 was prepared by using the positive electrode, the negative electrode, and the nonaqueous electrolyte solution described above, and a separator according to the following procedure.

(1) The positive electrode and the negative electrode separated from each other by the separator were wound to obtain a wound electrode assembly.

(2) An insulating plate was placed on the top of the wound electrode assembly and another at the bottom of the wound electrode assembly, and the wound electrode assembly was placed in a cylindrical battery outer casing can having a diameter of 18 mm and a height of 65 mm. The battery outer casing can was composed of steel and also served as a negative electrode terminal.

(3) A negative electrode current collecting tab was welded to the inner bottom portion of the battery outer casing can and a positive electrode current collecting tab was welded to a bottom plate of a sealing member having a safety valve and a current-interrupting mechanism. The sealing member functions as a positive electrode terminal.

(4) The nonaqueous electrolyte solution was supplied from an opening of the battery outer casing can, the battery outer casing can was sealed by using the sealing member, and a nonaqueous electrolyte secondary battery B1 was obtained as a result. The designed capacity of the nonaqueous electrolyte secondary battery B1 was 1900 mAh.

Example 2

A positive electrode active material A2 was prepared as in Example 1 except that the firing temperature for obtaining the sodium-nickel composite oxide was 950° C. A nonaqueous electrolyte secondary battery B2 was prepared as in Example 1 by using the positive electrode active material A2. Dv of the positive electrode active material A2 was 9.6 μm and the average particle diameter of the primary particles constituting the positive electrode active material A2 was 3.0 μm.

Example 3

A positive electrode active material A3 was prepared as in Example 1 except that the firing temperature for obtaining the sodium-nickel composite oxide was 900° C. A nonaqueous electrolyte secondary battery B3 was prepared as in Example 1 by using the positive electrode active material A3. Dv of the positive electrode active material A3 was 9.7 µm, and the average particle diameter of the primary particles constituting the positive electrode active material A3 was 2.5 µm.

Example 4

Reaction was conducted at a pH of 12 and a temperature of 40° C. by slowly adding dropwise an aqueous sodium hydroxide (NaOH) solution and an aqueous ammonia ($NH_3$) solution to an aqueous solution of a mixture of nickel sulfate ($NiSO_4$) and cobalt sulfate ($CoSO_4$) (Ni/Co molar ratio=0.82/0.18). The resulting reaction product was filtered, washed with water, and dried at 120° C. As a result, hydroxide particles having a composition of $Ni_{0.82}Co_{0.18}(OH)_2$ were obtained. The hydroxide particles were then mixed with sodium nitrate ($NaNO_3$) so that the Li/(Ni+Co) molar ratio was 0.95. The mixture was retained at a firing temperature of 750° C. for 35 hours. As a result, a sodium-nickel composite oxide was obtained.

A molten salt bed prepared by mixing lithium nitrate ($LiNO_3$) and lithium hydroxide (LiOH) at a $LiNO_3$/LiOH molar ratio of 61:39 was added to the sodium-nickel composite oxide so that there were 5 eq (25 g) of the molten salt bed with respect to 5 g of the sodium-nickel composite oxide. The mixture was retained at a firing temperature of 200° C. for 10 hours to exchange the Na ions in the sodium-nickel composite oxide with Li ions. The substance after ion exchange was washed with water. A lithium-nickel composite oxide was obtained as a result.

A hydroxide having a composition of $Ni_{0.82}Co_{0.18}(OH)_2$ and a molten salt bed of the lithium compound described above were added to the lithium-nickel composite oxide, and the resulting mixture was re-fired at 700° C. for 50 hours in an oxygen atmosphere to obtain a composite oxide A4. The composite oxide A4 obtained by the re-firing was classified and those particles with Dv of 9.8 µm were used as a positive electrode active material A4. The average particle diameter of the primary particles constituting the positive electrode active material A4 was 4.5 µm.

Comparative Example 1

Reaction was conducted at a pH of 12 and a temperature of 40° C. by slowly adding dropwise an aqueous sodium hydroxide (NaOH) solution and an aqueous ammonia ($NH_3$) solution to an aqueous solution of a mixture of nickel sulfate ($NiSO_4$), cobalt sulfate ($CoSO_4$), and manganese sulfate ($MnSO_4$) (Ni/Co/Mn molar ratio=0.33/0.33/0.33). The resulting reaction product was filtered, washed with water, and dried at 120° C. As a result, hydroxide particles having a composition of $Ni_{0.33}Co_{0.33}Mn_{0.33}(OH)_2$ was obtained. The hydroxide particles were then mixed with lithium hydroxide (LiOH) so that the Li/(Ni+Co+Mn) molar ratio was 3.33. The resulting mixture of the hydroxide particles and lithium hydroxide was fired at 900° C. for 24 hours. The fired product was washed with water and filtered repeatedly until excess lithium atoms were sufficiently removed. The resulting product was vacuum dried at 120° C. for 24 hours. As a result, a positive electrode active material X1 having a composition of $Li_{1.05}Ni_{0.33}Co_{0.33}Mn_{0.33}O_2$ was obtained. A nonaqueous electrolyte secondary battery Y1 was prepared as in Example 1 by using the positive electrode active material X1. The positive electrode active material X1 had Dv of 9.9 µm and the average particle diameter of the primary particles constituting the positive electrode active material X1 was 2.5 µm.

Figure 4:
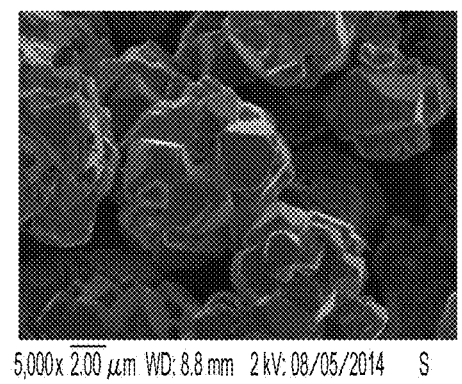
FIG. 4 is an electron microscope image of a positive electrode active material according to related art (Comparative Example 1)
Figure 5:
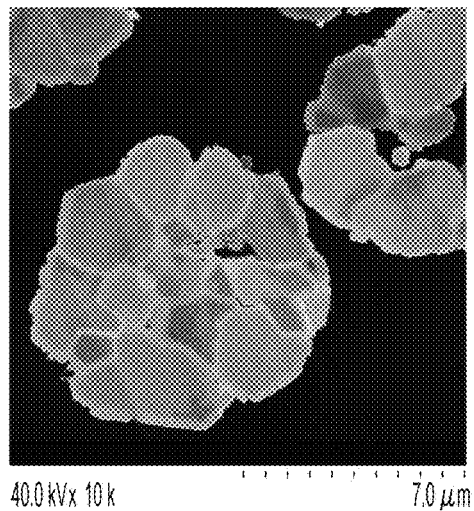
FIG. 5 is an electron microscope image showing a particle cross-section of the positive electrode active material according to the related art (Comparative Example 1)

FIG. 4 shows a SEM image of the positive electrode active material X1 and FIG. 5 shows a SEM image of a CP cross-section of the positive electrode active material X1. The SEM images show that the positive electrode active material X1 has no surface layer voids. The images also show that the positive electrode active material X1 has larger irregularities on the particle surfaces compared to the positive electrode active material A1.

Comparative Example 2

To the hydroxide particles having a composition of $Ni_{0.33}Co_{0.33}Mn_{0.33}(OH)_2$ obtained in Example 1, lithium hydroxide (LiOH) was added so that the Li/(Ni+Co+Mn) molar ratio was 1.05. The mixture of the hydroxide particles and lithium hydroxide was fired at 900° C. for 24 hours. A positive electrode active material X2 having a composition of $Li_{1.05}Ni_{0.33}Co_{0.33}Mn_{0.33}O_2$ was obtained as a result. A nonaqueous electrolyte secondary battery Y2 was prepared as in Example 1 by using the positive electrode active material X2. The positive electrode active material X2 had a Dv of 9.6 µm and the average particle diameter of the primary particles constituting the positive electrode active material X2 was 0.5 µm.

Figure 6:
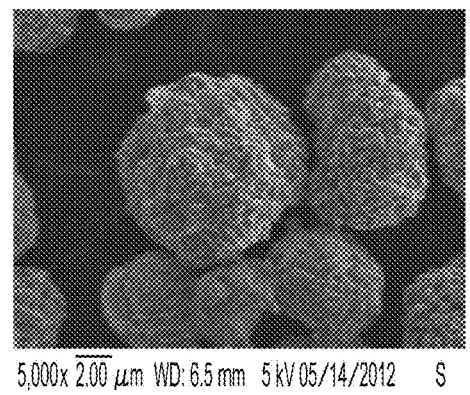
FIG. 6 is an electron microscope image of a positive electrode active material according to related art (Comparative Example 2)
Figure 7:
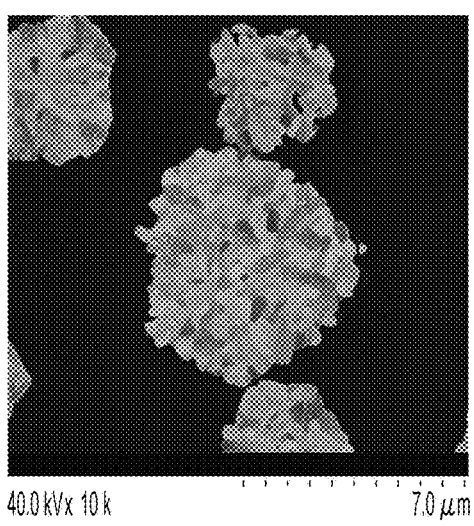
FIG. 7 is an electron microscope image showing a particle cross-section of the positive electrode active material according to the related art (Comparative Example 2).

FIG. 6 shows a SEM image of the positive electrode active material X2 and FIG. 7 is a SEM image of a CP cross-section of the positive electrode active material X2. The SEM images show that the positive electrode active material X2 has no surface layer voids as with the positive electrode active material X1. The images also show that the positive electrode active material X2 has a large primary particle diameter and large irregularities on the particle surfaces compared with the positive electrode active material A1.

Comparative Example 3

Reaction was conducted at a pH of 12 and a temperature of 40° C. by slowly adding dropwise an aqueous sodium hydroxide (NaOH) solution and an aqueous ammonia ($NH_3$) solution to an aqueous solution of a mixture of nickel sulfate ($NiSO_4$) and cobalt sulfate ($CoSO_4$) (Ni/Co molar ratio=0.84/0.16). The resulting reaction product was filtered, washed with water, and dried at 120° C. As a result, hydroxide particles having a composition of $Ni_{0.84}Co_{0.16}(OH)_2$ were obtained. The hydroxide particles were then mixed with lithium hydroxide (LiOH) so that the Li/(Ni+Co) molar ratio was 3.33. The resulting mixture of the hydroxide particles and lithium hydroxide was fired at 750° C. for 24 hours in an oxygen atmosphere. The resulting fired product was repeatedly washed with water and filtered until excess lithium atoms were sufficiently removed. The resulting product was vacuum dried at 120° C. for 24 hours. As a result, a positive electrode active material X3 having a composition of $Li_{1.05}Ni_{0.84}Co_{0.16}O_2$ was obtained. A nonaqueous electrolyte secondary battery Y3 was prepared as in Example 1 by using the positive electrode active material X3. The positive electrode active material X3 had Dv of 9.6 µm and the average particle diameter of the primary particles constituting the positive electrode active material X3 was 4.5 µm.

Dv, the average primary particle diameter, and the average surface layer void ratio of the positive electrode active materials obtained in Examples and Comparative Examples were evaluated. The capacity per active material weight and cycle characteristics (capacity retention ratio at 100th cycle) of the nonaqueous electrolyte secondary batteries were also evaluated. The results are shown in Table.

Evaluation of Dv

Dv of the positive electrode active material (secondary particles) was determined with a laser diffraction scattering particle size distribution analyzer (trade name: LA-920 produced by Horiba Ltd.) by using a dispersion medium prepared by dispersing 1 mL of a surfactant (trade name: Extran MA02, neutral, produced by MERCK) in 100 mL of ion exchange water. The measurement conditions were as follows: ultrasonic dispersion: 1 min, ultrasonic intensity: 1, circulation rate: 2, relative refractive index: 1.60 to 0.25.

Evaluation of Average Primary Particle Diameter

From an image of a positive electrode active material obtained by observation with a SEM (×2000 magnification), 10 particles were selected at random. The particle boundaries of the selected 10 particles were observed and the primary particles were identified. The longest diameter of the primary particle was determined, and the average of the diameters of the 10 particles was assumed to be the average primary particle diameter.

Evaluation of Average Surface Layer Void Ratio

From a SEM image obtained by observing a CP cross-section of the composite oxide A with a SEM (×2000 magnification), 100 particles were selected at random. An outline is drawn along a surface of each of the selected 100 particles. A total area of the voids in the region surrounded by the outline and an area (total area) of surface layer voids formed in the range that extended from the particle surface by a length equal to 5% or less of the particle diameter of that particle were determined. The surface layer void ratio (%) was calculated by formula, (area of surface layer voids/total area of voids)×100. The average of the surface layer void ratios of the 100 particles was assumed to be the average surface layer void ratio.

Evaluation of Cycle Characteristics (Capacity Retention Ratio at 100th Cycle)

Each nonaqueous electrolyte secondary battery was subjected to a charge and discharge test under the following conditions and the capacity retention ratio at the 100th cycle was calculated from the formula below:

Capacity retention ratio=(discharge capacity at 100th cycle/discharge capacity at 1st cycle)×100

Charge-discharge conditions: Constant-current charging was performed at a current of 1.0 lt (1900 mA) until battery voltage was 4.3 V and then constant-voltage charging was performed at a voltage of 4.3 V until current value was 0.05 lt (95 mA). After 10 minutes of interval, constant-current discharging was performed at a current of 1.0 lt (1900 mA) until battery voltage was 3.0 V. The charge-discharge test was conducted at a temperature of 45° C.

Evaluation of Capacity Per Active Material Weight

The discharge capacity at the first cycle of the charge-discharge test described above was divided by the weight of the positive electrode active material to determine the capacity per active material weight.

TABLE

| | Composition of lithium composite oxide | Dv (μm) | Primary particle diameter (μm) | Surface layer void ratio (%) | Capacity (mAh/g) | Cycle characteristics (%) |
|---|---|---|---|---|---|---|
| Example 1 | $Li_{1.05}Ni_{0.33}Co_{0.33}Mn_{0.33}O_2$. | 9.9 | 4.0 | 16 | 162 | 98 |
| Example 2 | $Li_{1.05}Ni_{0.33}Co_{0.33}Mn_{0.33}O_2$ | 9.6 | 3.0 | 21 | 163 | 96 |
| Example 3 | $Li_{1.05}Ni_{0.33}Co_{0.33}Mn_{0.33}O_2$ | 9.7 | 2.5 | 30 | 164 | 95 |
| Example 4 | $Li_{1.05}Ni_{0.84}Co_{0.16}O_2$ | 9.8 | 4.5 | 15 | 208 | 96 |
| Comparative Example 1 | $Li_{1.05}Ni_{0.33}Co_{0.33}Mn_{0.33}O_2$ | 9.8 | 2.5 | 0 | 132 | 95 |
| Comparative Example 2 | $Li_{1.05}Ni_{0.33}Co_{0.33}Mn_{0.33}O_2$ | 9.6 | 0.5 | 0 | 156 | 84 |
| Comparative Example 3 | $Li_{1.05}Ni_{0.84}Co_{0.16}O_2$ | 9.6 | 4.5 | 0 | 175 | 96 |

As shown in Table, the nonaqueous electrolyte secondary batteries B1 to B3 of Examples had higher capacity per active material weight and better cycle characteristics than the nonaqueous electrolyte secondary battery Y2 of Comparative Example. The nonaqueous electrolyte secondary batteries B1 to B3 had higher capacity per active material weight than the nonaqueous electrolyte secondary battery Y1. Although the nonaqueous electrolyte secondary battery Y1 has good cycle characteristics, the active material utilization rate is low. In other words, a battery having a high active material utilization rate and good cycle characteristics can be obtained only when a lithium composite oxide that is formed of primary particles with an average particle diameter of 1 μm or more and has surface layer voids is used as the positive electrode active material.

What is claimed is:

1. A positive electrode active material for a nonaqueous electrolyte secondary battery, comprising:
   a lithium composite oxide particle as a main component, in which a ratio of Ni to a total number of moles of all metal elements other than Li is greater than 30 mol %,
   wherein the lithium composite oxide particle includes a secondary particle being aggregation of primary particles having an average particle diameter of 1 μm or more and 15 μm or less, and a shell constituted around the secondary particle,
   wherein the shell has a same composition as the secondary particle,
   wherein a surface layer void is present between the secondary particle and the shell,
   wherein the lithium composite oxide particle has voids constituted therein,
   wherein the surface layer void is constituted within a range that extends from a surface of the lithium composite oxide particle by a length equal to 5% or less of a diameter of that particle, and
   wherein the surface layer void constituted within a range that extends from a surface of the lithium composite oxide particle by a length equal to 5% or less of a diameter of that particle accounts for 10% or more of the voids.

2. The positive electrode active material according to claim 1, wherein the lithium composite oxide particle has a volume-average particle diameter of 7 to 30 μm.

3. A nonaqueous electrolyte secondary battery comprising:
- a positive electrode that includes the positive electrode active material;
- a negative electrode; and
- a nonaqueous electrolyte,
- wherein the positive electrode active material for a nonaqueous electrolyte secondary battery includes a lithium composite oxide particle as a main component, in which a ratio of Ni to a total number of moles of all metal elements other than Li is greater than 30 mol %,
- wherein the lithium composite oxide particle includes a secondary particle being aggregation of primary particles having an average particle diameter of 1 μm or more and 15 μm or less, and a shell constituted around the secondary particle,
- wherein the shell has a same composition as the secondary particle,
- wherein a surface layer void is present between the secondary particle and the shell,
- wherein the lithium composite oxide particle has voids constituted therein,
- wherein the surface layer void is constituted within a range that extends from a surface of the lithium composite oxide particle by a length equal to 5% or less of a diameter of that particle, and
- wherein the surface layer void constituted within a range that extends from a surface of the lithium composite oxide particle by a length equal to 5% or less of a diameter of that particle accounts for 10% or more of the voids.

4. The nonaqueous electrolyte secondary battery according to claim 3, wherein the lithium composite oxide particle has a volume-average particle diameter of 7 to 30 μm.

* * * * *